United States Patent Office 3,575,903
Patented Apr. 20, 1971

3,575,903
ANTISTATIC COMPOSITIONS OF POLYSTYRENES AND N-OXYETHYLATED ALKYLAMINES
Konrad Rombusch and Friedrich Seifert, Marl, Germany, assignors to Chemische Werke Huls A.G., Marl, Germany
No Drawing. Filed July 20, 1966, Ser. No. 566,474
Claims priority, application Germany, July 29, 1965, P 15 44 712.8
Int. Cl. C08f 33/02, 19/08, 19/18
U.S. Cl. 260—23   12 Claims Applicants hereby claim the benefit of the filing date of West German patent application C 36,529 IVc/39b of July 29, 1965.

The present invention relates generally to a process for treating polymers of styrene to minimize or eliminate the accumulation of electrostatic charges.

It is known that plastic articles, and particularly those made of polystyrene, can be rendered antistatic by treating the external surface thereof with alkyl or alkylaryl sulfonates (Boundy-Boyer, "Styrene" [1952], p. 551). The surface of polymers of styrene so treated is, however, oily and sticky, and the protection against the accumulation of electrostatic charges obtained in this manner lasts only until the applied thin layer of the antistatic agent is worn, peeled, or washed off. Therefore, it is preferred to incorporate into and as an integral part of the polyolefin composition, before such compositions are molded, suitable additives, for example, polyvalent alcohols, such as polyethylene glycols (British Pat. No. 781,177), polyamines, such as N,N'-dioleyl diethylene triamine (U.S. Pat. No. 2,921,048), or ammonium salts, such as alkyl trimethylammonium bromides (British Pat. No. 888,161). Such incorporated compounds are ineffective for practical purposes and, moreover, impair the mechanical property characteristics of the polystyrene.

When these conventional antistatic agents are incorporated into polymers of styrene in amounts sufficient to obtain the desired destaticizing effect, the optical and mechanical properties of the polymer are deleteriously affected. Thus, incorporation of an effective amount, i.e., 2–6% by weight of alkyl sulfonate in transparent polystyrene reduces the transparency thereof. Also the copolymerization or admixture with styrene of an ammonium or alkali salt of sulfonated polystyrene (U.S. Pats. No. 2,707,709 and No. 2,971,947) seriously impairs the mechanical properties of the resultant polymer.

Moreover, it has been found that the antistats used in polyvinyl chloride, i.e., the polyglycol esters having a lower degree of glycol polymerization, such as esters of triethylene glycol and lauric acid, are ineffective when used in polystyrene. To obtain, in styrene, the desired degree of antistatic protection, only those polyglycol esters are effective which have a much higher degree of glycol polymerization, for example polyethylene glycol-1200 dicaproate, wherein the number indicates the molecular weight of the polyethylene glycol. It was also found that polyolefin antistats, such as alkanol polyoxyethylates having 10–15 carbon atoms in the alkyl chain and 2–10 ethylene oxide units, provide little or no antistatic protection when used in polymers of styrene, and that this class of antistats are effective only when they have a higher degree of oxyethylation of about 30 to 100 ethylene oxide units, e.g.

It is, therefore, a principal object of this invention to provide an improved treatment of polymers of styrene to prevent the accumulation of static electricity thereon.

Another object of this invention is to provide a method of imparting improved antistatic protection to polymers of styrene without impairing the optical and mechanical properties thereof.

Still another object of this invention is to provide for polymers of styrene a new class of antistatic agents.

These and other objects and advantages of the invention will become apparent by reference to the following description and claims appended hereto.

It has been surprisingly discovered that polymers of styrene can be endowed with excellent antistatic properties by incorporating therein from about 0.5 to 3% by weight, preferably 1.5 to 2.5% by weight, of N-oxyethylated alkylamines of the formula:

(I)

wherein $R_1$ represents an alkyl or alkenyl group of 6–22 carbon atoms;

$R_2$ and $R_3$ represent a residue $(C_2H_4O)_nH$, $n$ being 1 to 3, preferably 1, wherein $R_3$ can also represent hydrogen.

These compounds can be used by themselves or in mixture with other antistatically effective compounds.

It is preferred to employ as $R_1$ a saturated or unsaturated (preferably of 1 to 3 cumulative or non-cumulative double bonds), straight-chain or branched alkyl of 12–16 carbon atoms. The nitrogen atom can be bound to a secondary carbon atom, as well as, preferably, to a primary carbon atom. Suitable as $R_1$ are, for example, the following residues: ethylbutyl, n-hexyl, n-octyl, 2-ethylhexyl, n-nonyl, i-nonyl, n-decyl, n-dodecyl, n-dodecenyl, i-dodecyl, n-tetradecyl, i-tetradecyl, n-hexadecyl, 2-hexyldecyl, n-octadecyl, and octadecenyl, or mixtures of these residues, such as the isomeric mixture of trimethylhexyl, i-tetradecyl, cocoanut oil alkyl, tallow-type fatty alkyl, and other fatty alkyl residues. More preferred residues are decyl, dodecyl, tetra-decyl, and hexadecyl residues, and mixtures thereof.

In the destaticization of transparent polystyrene of a molecular weight between 1,500 and 300,000 with the antistats of the present invention, $R_1$ preferably contains 8–14, particularly 10 carbon atoms; for impact-resistant polystyrene, $R_1$ preferably contains 10–18, particularly 14 carbon atoms; and for graft or copolymerizates of styrene with acrylonitrile and butadiene, $R_1$ preferably contains 8–16, particularly 12 carbon atoms.

$R_2$ and $R_3$ can be an identical or different number of $(C_2H_4O)_nH$ groups wherein $n$ has a value of from 1 to 3, particularly 1. $R_3$ can also represent hydrogen when $R_2$ is any of these other residues.

Suitable as the above-described antistatic agents are, for example, the addition products of 2 mols of ethylene oxide to 1 mol of n-hexylamine; of 1 mol of ethylene oxide to 1 mol of 2-ethylbutylamine; of 5 mols of ethylene oxide to 1 mol of oleylamine; of 6 mols of ethylene oxide to 1 mol of eicosylamine; of 3 mols of ethylene oxide to 1 mol of tetradecylamine; of 1 mol of ethylene oxide to 1 mol of a mixture of isomeric, branched dodecylamines; and of 2 mols of ethylene oxide to 1 mol of a mixture of isomeric, branched trimethylhexylamines. Preferred are the addition products of 2 mols of ethylene oxide to 1 mol of any of tallow fatty alkylamine, cocoanut oil alkylamine, a mixture of isomeric centrally positioned tetradecylamines, n-dodecylamine, n-hexadecylamine, or n-decylamine.

Generally, more effective destaticization is achieved with agents having a narrower molecular weight distribution which is dependent, in large part, on the chain length of the aliphatic alcohol residue. One method of controlling the aliphatic alcohol residue chain length to obtain agents having a narrow molecular weight distribution is to catalytically react ethylene oxide with the dihydroxyethyl derivative previously produced without a catalyst. The amount of an alkali catalyst needed to increase the chain length of the aliphatic alcohol is preferably 0.1 to 1% by weight with respect of the dihydroxyethyl derivative of an alkali selected from the group consisting of sodium hydroxide or potassium hydroxide.

The above-described methods of preparing the antistatic compounds of this invention do not always produce only one lone species thereof, but instead, there is often obtained a mixture of homologs. These homologs differ with respect to the number of carbon atoms in the various alkyl groups, as well as the number of repeating aliphatic alcohol residues. In terms of protection afforded against the accumulation of static electricity, these chemical differences are normally of little importance, and there can be used as the alkylamine a mixture of fatty amines, particularly when the molecular weight distribution is within a narrow range.

Satisfactory destaticization of polymers of styrene is also achieved with various of the compounds embraced by Formula I wherein the substituents $R_2$ and $R_3$ are different from each other. Such compounds are obtained, for example, by substituting a first hydroxyethyl group for only one hydrogen atom of the amino group, or else by reacting the dihydroxyethyl derivative, in the presence of a catalytic amount of alkali, with a further mol of ethylene oxide, there being obtained, for example, the alkyl-N-hydroxyethyl-N-hydroxyethyl-oxyethylamine.

It is also desirable to employ a mixture of the same or different species of these new antistatic agents. In fact, effective destaticization of polymers of styrene is obtained when one or several of the substituents $R_1$, $R_2$, or $R_3$ differ.

It has also been found advantageous to employ in combination with the compounds of Formula I, a fatty acid having 6 to 22, preferably 12 to 18 carbon atoms, and 1 to 3 double bonds, in amounts of up to 100 molar percent, preferably from 25 to 80 molar percent, based on the oxyethylated alkylamine. Suitable fatty acids are, for example, lauric acid, palmitic acid, stearic acid, oleic acid, linoleic acid, and ricinoleic acid. By the addition of the fatty acid, the antistatic effect of the oxyethylates of alkylamines can be further increased, and at the same time, the fatty acid serves as mold release agent.

The foregoing antistatic agents can be added to polystyrene, such as those types produced by block, suspension, or emulsion polymerization, as well as impact-resistant copolymerizates or graft polymerizates, such as those containing 60.0 to 99.99% by weight of styrene and 0.01 to 40.0% by weight of butadiene, copolymerizates containing 40.0 to 95.0% by weight of styrene and 5.0 to 50.0% by weight of acrylonitrile, and copolymerizates or graft polymerizates containing 5.0 to 40.0% by weight of acrylonitrile, 1.0 to 50.0% by weight of butadiene, and 40.0 to 90.0% by weight of styrene. In the polymerizates, the styrene can be completely or partially replaced by substituted styrenes, such as α-methyl styrene. Particularly suitable are, for example, polystyrenes produced by suspension or block polymerization, as well as the impact-resistant butadiene-containing co- or graft polymerizates.

In particular, the invention is useful with polystyrenes having any molecular weight that allows common manufacture, and polymers of styrene containing 5 to 35% by weight of butadiene and 65 to 95% by weight of styrene. Such polymers are suitable for many products which ordinarily have particularly great troubles because of their static charge. Such products are toys, wainscots for ceilings, drinking-cups, telephone boxes, packing boxes and other articles made by extrusion, blowing or injection molding.

The antistatic agents of this invention can be incorporated into the polymers of styrene in various ways. For example, the antistatic agent can be added to the polymerizates in powdered, bead, or granulate form, and the resultant material mixed to form a homogeneous mass. For this purpose, a mixing mill can be used to form mill granulates. The mixture can also be homogenized, if desired, by kneading, such as in a roll mill. It is also desirable to mix the antistatic agent dissolved, dispersed, suspended, or emulsified in a suitable organic solvent with powdered polystyrene. Thereafter, the solvent or emulsifying agent can be removed, for example, by heating the polymer to vaporize the solvent. Solvents well suited for this purpose are methanol, ethanol, acetone and dioxane. The obtained polymer-antistat mixture can then be granulated, for example, before the extrusion thereof.

The polymerizates used can also contain the conventional additives, such as pigments and dyes, i.e., coloring materials, fillers, stabilizers, mold release agents, or expanding (gas developing) agents, as well as, if desired—particularly in case of the butadiene-containing polymers—antioxidants. If desired, one or more conventional antistatic agents can be employed together with the novel antistats of this invention.

Alternatively, finished molded articles can be destaticized with a solution of the antistatic agents applied by immersing, by spraying, or by transfer from a wiping cloth. For this purpose, preferred are, for example, 0.01 to 2.0% solutions in water or suitable organic solvents, such as methanol, ethanol, acetone, dioxane.

Although a finite quantity of the antistatic agent of this invention provides a finite reduction in the accumulation of static electricity in polymers of styrene, the antistatic agent desirably constitues 0.5 to 3.0% by weight of the polymer. Generally, the protection against electrostatic charging decreases with decreasing concentrations of the antistatic agent and when the concentration is below 0.5% by weight, the antistatic protection may not completely prevent the accumulation of dust on the surface of the polystyrene article. On the other hand, concentrations of the agent higher than 3% by weight, generally afford little improvement in the antistatic protection over and above the effective destaticization provided by using from 0.5 to 3.0% by weight of the antistat.

Polymers of styrene containing these antistatic agents can be utilized in the production of articles by any of the conventional shaping methods. When it is necessary to heat the polymeric mass in shaping, it has been found that the antistat retains its activity even when the mass is heated to temperatures ranging between 160 and 270° C.

Articles produced from polymers of styrene which are treated with the antistats of the present invention exhibit up to and including a 100-fold improvement in the surface resistance values, e.g., lower by up to two powers of ten, over the prior art oxyethylates of alkanols. In view of the higher potency and effectiveness of the present antistatic agents in comparison to conventional antistats, satisfactory destaticization of polymers of styrene can now be attained with significantly smaller amounts of the agent. In addition to the economy afforded by the use of smaller quantities of the present agent, the disadvantages normally attendant to the use of the conventional agents, i.e., impairment of the appearance, the mechanical properties, and the processability of the molded masses, are eliminated. Moreover, the use of the present antistatic agents in transparent polystyrene does not affect the optical characteristics thereof, and there is also no effect on the impact resistance of polymers of styrene.

A further advantage of the agents of the present invention is that they can be used in varying amounts within a concentration range of 0.5 to 3% by weight, irrespective of the manner in which they are to be subsequently processed, whereas the amount of the conventional antistatic agents to be used is dependent on the desired properties of the resultant admixture, such as the mechanical properties and the processing technique thereof. The lack of any adverse effect of the oxyethylated alkylamines on polymers of styrene is particularly surprising because the use of these agents in polyvinyl chloride not only adversely affects the stability of the polymer, but also considerably impairs the processability thereof. Furthermore, in most cases, as for example, in the case of calendered polyvinyl chloride films, the agents of the present invention prove to be completely ineffective.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

A series of tests, the results of which are shown in Table I, were conducted by incorporating various of the oxyethylated alkylamines in a number of polymers of styrene.

In these tests, the Roman numerals in the polymerizate column indicate the following:

I=Polystyrene (suspension or block polymerizate); styrene copolymerizates of styrene and acrylonitrile containing between 20 and 30% by weight of acrylonitrile; copolymerizates of styrene and α-methyl styrene containing between 10 and 20% by weight of α-methyl styrene. The molecular weights of the polymerizates employed range between 100,000 and 200,000.

II=Impact-resistant polystyrene having a butadiene content of 10% by weight. These polymers were extruded at temperatures of 180° C. and the length of the extruded spiral (used as a measure of the fluidity of the polymer) was from 80-100 cm.

III=Acrylonitrile-butadiene-styrene graft polymerizates containing 18-27% butadiene and 20-25% acrylonitrile. The length of the spiral extruded at 210° C. under the same manufacturing conditions and with the same device likewise was from 80-100 cm.

In tests 6 to 8, 15, 17 to 20, and 28 to 31, compounds differing from the present antistatic agents were incorporated in the various polymers of styrene to compare the antistatic effectiveness thereof.

From the results shown in Table I, appended hereto, it can be seen that the polymers of styrene treated with the antistatic agents of the present invention exhibit a marked improvement in surface resistance and dissipation of charge over those treated with other antistatic agents.

To determine the antistatic effect of the present agents on polymers of styrene containing the same, the surface resistance of square molded bodies produced therefrom and having a thickness of 1 mm. and an edge length of at least 150 mm. was measured according to DIN (German Industry Standard) 53 482–VDE 0303, Part 3. The rate at which the charge on the surface of the plates dissipated was also determined by using the rotating field strength measuring device per Schwenkhagen (see M. Bühler, "Textile Practice" 12/11, p. 1147 [1957]).

In additional dust tests, the surface resistance was measured at 22° C. and 40% relative humidity after the surface of the molded plate had been charged by vigorously rubbing its surface with a dry cotton cloth. The surface of the charged article is then positioned a distance directly over finely powdered cigarette ashes to determine whether the magnitude of the charge on the surface is sufficient to attract the ashes. The test is deemed positive if the rubbed plate does not attract any ash particles. The results of these dust tests on each of the polymers treated are tabulated in Table I. (In the ash dust test, + indicates "no ash is attracted"; (+) indicates "there is a minor attraction"; (−) indicates "there is a medium attraction"; and − indicates "there is a strong attraction.")

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

TABLE I

| Test | Polymerizate | Amine | Mol of ethylene oxide | Amount of additive, percent by weight | Surface resistance (MΩ) at 40% relative humidity | Dissipation of charge at 23° C. and 50% relative humidity | Dust test |
|---|---|---|---|---|---|---|---|
| 1 | I | n-Hexylamine | 2 | 2.5 | $2 \cdot 10^6$ | Moderately fast | (+) |
| 2 | I | n-Decylamine | 2 | 2.5 | $5 \cdot 10^4$ | Very fast | + |
| 3 | I | n-Tetradecylamine | 2 | 2.5 | $4 \cdot 10^5$ | Fast | (+) |
| 4 | I | n-Decylamine | 5 | 2.5 | $2 \cdot 10^5$ | do | (+) |
| 5 | I | n-Decylamine / Lauric acid | 2 | 2.5 / 2 | $2 \cdot 10^4$ | Very fast | + |
| 6 | I | n-Decylamine | 10 | 2.5 | $>10^7$ | Very slow | − |
| 7 | I | n-Decanol | 2 | 2.5 | $>10^7$ | do | − |
| 8 | I | do | 10 | 2.5 | $>10^7$ | do | − |
| 9 | II | n-Hexylamine | 2 | 2.5 | $3 \cdot 10^6$ | Moderately fast | (+) |
| 10 | II | n-Decylamine | 2 | 2.5 | $9 \cdot 10^4$ | Fast | + |
| 11 | II | Iso-tetradecylamine | 2 | 2.5 | $6 \cdot 10^4$ | Very fast | + |
| 12 | II | Iso-tetradecylamine / Stearic acid | 2 | 2.5 / 1.5 | $3 \cdot 10^4$ | do | + |
| 13 | II | n-Octadecylamine | 2 | 2.5 | $6 \cdot 10^3$ | Fast | (+) |
| 14 | II | n-Octadecen-(9,10)-ylamine | 2 | 2.5 | $5 \cdot 10^3$ | Very fast | + |
| 15 | II | n-Decylamine | 10 | 2.5 | $>10^7$ | Very slow | − |
| 16 | II | Iso-tetradecylamine | 5 | 2.5 | $8 \cdot 10^5$ | Moderately fast | (+) |
| 17 | II | do | 12 | 2.5 | $>10^7$ | Very slow | − |
| 18 | II | Sec.-tetradecanol | 2 | 2.5 | $>10^7$ | do | − |
| 19 | II | do | 20 | 2.5 | $>10^7$ | do | − |
| 20 | III | n-Butylamine | 2 | 2.5 | $>10^7$ | do | − |
| 21 | III | n-Octylamine | 2 | 2.5 | $1 \cdot 10^6$ | Moderately fast | (+) |
| 22 | III | n-Dodecylamine | 2 | 2.5 | $5 \cdot 10^3$ | Very fast | + |
| 23 | III | n-Dodecylamine / Lauric acid | 2 | 2.5 / 1 | $3 \cdot 10^3$ | do | + |
| 24 | III | n-Octadecylamine | 2 | 2.5 | $8 \cdot 10^5$ | Moderately fast | (+) |
| 25 | III | n-Dodecylamine | 0.5 | 2.5 | $7 \cdot 10^5$ | do | (+) |
| 26 | III | do | 3 | 2.5 | $4 \cdot 10^3$ | Very fast | + |
| 27 | III | do | 4 | 2.5 | $8 \cdot 10^4$ | do | + |
| 28 | III | do | 10 | 2.5 | $8 \cdot 10^6$ | Slow | (−) |
| 29 | III | do | 20 | 2.5 | $>10^7$ | Very slow | − |
| 30 | III | n-Dodecanol | 2 | 2.5 | $>10^7$ | do | − |
| 31 | III | do | 8 | 2.5 | $>10^7$ | do | − |

What is claimed is:

1. An antistatic composition comprising a normally solid polymer of styrene having substantially uniformly and intimately distributed therein from 0.5 to 3.0% by weight of at least one N-oxyethylated alkylamine of the formula:

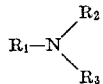

wherein $R_1$ represents an alkyl or alkenyl of 6–22 carbon atoms; $R_2$ and $R_3$, being the same or different, each represents —$(C_2H_4O)_nH$, $n$ being 1 to 3, or hydrogen, with the provision that $R_2$ and $R_3$ cannot both simultaneously represent hydrogen, and further distributed uniformly and intimately in said polymer of styrene, a fatty acid of 6–22 carbon atoms in a concentration of not more than 100 molar percent based on said N-oxyethylated alkylamine.

2. The antistatic composition of claim 1, wherein said polymer of styrene is selected from the group consisting of polystyrene and α-methyl polystyrene.

3. The antistatic composition of claim 1, wherein said polymer of styrene is selected from the group consisting of a copolymer of 60–99.99% styrene and 0.01–40.0% by weight butadiene; a copolymer of 40–95.0% styrene and 5–50% by weight acrylonitrile; and a graft polymer of 40–90.0% styrene, 1–50.0% butadiene, and 5–40% by weight acrylonitrile.

4. The antistatic composition of claim 1, wherein said polymer of styrene is transparent polystyrene, and $R_1$ is an alkyl or alkenyl of 8–14 carbon atoms.

5. The antistatic composition of claim 1, wherein said polymer of styrene is an impact-resistant copolymer of 60.0 to 99.99% by weight of styrene and 0.01 to 40.0% by weight of butadiene, and $R_1$ is an alkyl or alkenyl of 10–18 carbon atoms.

6. The antistatic composition of claim 1, wherein said polymer of styrene is a graft polymer of 40.0 to 90.0% by weight of styrene, 5.0 to 40.0% by weight of acrylonitrile, and 1.0 to 50.0% by weight of butadiene, and $R_1$ is as alkyl or alkenyl of 8–16 carbon atoms.

7. A molded object of an antistatic composition as defined by claim 1.

8. The antistatic composition of claim 1 wherein the fatty acid contains 12–18 carbon atoms and 1–3 double bonds and is present in a concentration of 25–80 molar percent based on the N-oxyethylated alkylamine.

9. A composition as defined by claim 1 wherein said fatty acid is selected from the group consisting of lauric acid, palmitic acid, stearic acid, oleic acid, linoleic acid, and ricinoleic acid.

10. A composition of claim 1 wherein $R_1$ is n-decyl, and the fatty acid is lauric acid.

11. A composition as defined by claim 1 wherein $R_1$ is iso-tetradecyl, and the fatty acid is stearic acid.

12. A composition as defined by claim 1 wherein $R_1$ is n-dodecyl and the fatty acid is lauric acid.

References Cited

UNITED STATES PATENTS

| | | | |
|---|---|---|---|
| 2,922,773 | 1/1960 | Coler et al. | 260—32.6 |
| 3,025,257 | 3/1962 | Coler | 260—32.6 |
| 3,371,130 | 2/1968 | Seifert et al. | 260—897 |

FOREIGN PATENTS

| | | |
|---|---|---|
| 645,800 | 9/1964 | Belgium. |
| 820,541 | 9/1959 | Great Britain. |
| 1,437,008 | 3/1966 | France. |

JOSEPH L. SCHOFER, Primary Examiner

S. M. LEVIN, Assistant Examiner

U.S. Cl. X.R.

260—23.5, 80.7, 83.7, 88.2, 92.8, 93.5, 94.9, 880